United States Patent [19]

Grögler et al.

[11] Patent Number: 5,091,497

[45] Date of Patent: Feb. 25, 1992

[54] HEAT-CURING POLYETHER-POLYESTER-POLYURETHANE UREAS

[75] Inventors: Gerhard Grögler, Leverkusen; Richard Kopp; Heinrich Hess, both of Cologne; Eduard Hänsel, Wuppertal; Thomas Scholl, Meerbusch, all of Fed. Rep. of Germany

[73] Assignee: Bayer Aktiengesellschaft, Leverkusen, Fed. Rep. of Germany

[21] Appl. No.: 621,179

[22] Filed: Nov. 30, 1990

[30] Foreign Application Priority Data

Dec. 6, 1989 [DE] Fed. Rep. of Germany ....... 3940273

[51] Int. Cl.$^5$ .............................................. C08G 18/32
[52] U.S. Cl. ........................................ 528/76; 528/77; 528/78
[58] Field of Search ............................... 528/76, 77, 78

[56] References Cited

U.S. PATENT DOCUMENTS

| | | | |
|---|---|---|---|
| 2,998,403 | 8/1961 | Muller et al. | 528/76 |
| 3,746,665 | 7/1973 | Koleske et al. | 528/76 |
| 3,838,105 | 9/1974 | Brachman | 528/76 |
| 4,323,657 | 4/1982 | Mazanek et al. | 521/116 |
| 4,435,537 | 3/1984 | Horn et al. | 524/391 |
| 4,483,974 | 11/1984 | Grogler et al. | 528/68 |
| 4,595,445 | 6/1986 | Hombach et al. | 156/307.3 |
| 4,954,537 | 9/1990 | Sanns | 528/76 |

FOREIGN PATENT DOCUMENTS 1260012 10/1986 Canada .

Primary Examiner—Maurice J. Welsh
Attorney, Agent, or Firm—Joseph C. Gil; Richard E. L. Henderson

[57] ABSTRACT

The present invention relates to heat-curable reaction systems prepared by mixing (a) solid polyisocyanates (optionally deactivated) having melting points above 80° C., (b) OH- and/or NH$_2$-terminated polyoxyalkylene polyethers that have molecular weights of 400 to 10,000 and are liquid at room temperature, (c) solid OH- and/or NH$_2$-terminated polyesters that have molecular weights of 400 to 20,000 and are solid at room temperature, and which are thoroughly distributed throughout the mixture but are not homogeneously miscible with the polyether, (d) optional low molecular weight chain-extending agents that contain OH and/or NH$_2$ groups and have a molecular weight of 62 to 399, and (e) optional catalysts and other auxiliaries. The invention further relates to a method for preparing elastomers, coating compounds, sealing compounds, or adhesives by heat-curing the heat-curable systems.

16 Claims, No Drawings

HEAT-CURING POLYETHER-POLYESTER-POLYURETHANE UREAS

BACKGROUND OF THE INVENTION

This invention relates to heat-curing reactive systems comprising mixtures of polyethers and polyesters that are not homogeneously miscible with one another, optional OH-and/or NH$_2$-terminated low molecular weight chain extenders, optional auxiliaries, and a solid polyisocyanate having a melting point above 80° C., in which the polyester component is present in admixture as a solid (such as powder or granules).

Polyurethanes based on polyoxyalkylene ethers are known to have poorer mechanical properties than polyester-based polyurethanes. Additional intermolecular secondary valence bonding forces occur in polyester urethanes by virtue of the polar groups present. A consequence of this is the crystallinity exhibited by many polyesters, which ultimately determines the quality of the end product. Thus, polyesters —or rather polyester urethanes —often behave differently from polyether systems, even at high or low temperatures. Polyester polyurethanes are used as high quality products, particularly in those industrial fields where stringent mechanical requirements must be satisfied.

Nevertheless, the majority of polyurethanes are based on polyethers. Polyethers can be "refined" by modification in numerous ways, so that the resulting end products also satisfy more stringent practical requirements. Another important factor is that polyethers are generally liquid at room temperature and, hence, are much easier to process than, for example, solid polyesters. Other advantages and disadvantages of both classes of these high molecular weight compounds are well known to one skilled in the art. There has been no shortage of attempts to eliminate or at least reduce the disadvantages specific to polyethers or polyesters by addition of polyesters or polyethers. Unfortunately, many polyethers and polyesters are incompatible with one another because of differences in their structural units. Emulsions or suspensions which separate very quickly into two phases are obtained after mixing of the two components, particularly when using polyesters based, for example, on adipic acid and ethylene glycol or 1,4-butanediol.

When used in combination with chain-extending agents and polyisocyanates, commercially available, inexpensive polyesters give particularly high-quality elastomers. A two-phase system is particularly difficult to process on an industrial scale. Despite appropriate countermeasures (for example, use of special stirrers), dosing errors can occur. In addition, phase separation occurs during solidification, even after addition of the polyisocyanate. These more or less distinct phases react with the isocyanate after a relatively long reaction time, but a homogeneous, complete reaction often does not occur. Because polyesters are generally much more reactive than polyethers, preliminary reactions occur. The more sluggishly reacting polyether can often appear as a "greasy layer" on the surface of the moldings. The poly-addition reaction can be accelerated by the use of suitable catalysts. Because of a rapid increase in viscosity, however, the "pot life" of the reaction mixtures is affected, so that processing by casting is not possible. It has now surprisingly been found that the disadvantages mentioned above do not arise when a powder-form polyester that is solid at room temperature is suspended as the polyester component in the polyether.

The resultant suspensions are pourable, spreadable, or paste-like, depending on the quantity of solids added, and o solidify upon heating. It has surprisingly been found in this regard that the ordinarily incompatible polyethers and polyesters do not separate. Instead, homogeneously cured moldings having a "dry surface" are obtained after rapid hardening.

Microscopic examination of thin films has shown that the polyurethane matrix consists of a polyether urethane or a polyester urethane, depending on the polyether or polyester component. When a matrix of polyether urethane is present, the s polyester urethane is uniformly distributed throughout the polyether urethane matrix as small beads (about 1–5 μm). In When elongated, these beads are longitudinally deformed in the direction of the force applied. After relaxation, the starting condition is re-established.

SUMMARY OF THE INVENTION

Accordingly, the present invention relates to heat-curable reaction systems comprising mixtures of
 (a) solid polyisocyanates (optionally deactivated) having melting points above about 80° C.,
 (b) linear or branched OH- and/or NH$_2$-terminated polyoxyalkylene polyethers that have molecular weights of about 400 to about 10,000 (preferably 1,000 to 6,000 and more preferably 1,000 to 4,000) and are liquid at room temperature,
 (c) solid linear or branched OH- and/or NH$_2$-terminated polyesters that have molecular weights of about 400 to about 20,000 (preferably 1,000 to 6,000) and are solid at room temperature, wherein said polyesters are thoroughly distributed throughout the mixture but are not homogeneously miscible (that is, in one phase) with polyether (b),
 (d) optionally, low molecular weight chain-extending agents that contain OH and/or NH$_2$ groups and have a molecular weight of about 62 to about 399, and
 (e) optionally, known catalysts and other auxiliaries used in polyurethane chemistry.

In the pre-cured state, the heat-curable reaction mixture contains component (c) as a solid (preferably a finely divided solid such as a fine powder or granules) that is well distributed during the mixing process. When using finely divided powders, preferred particle sizes range from about 10 to about 200 μm (more preferably, 20 to 100 μm). The reactive components are used in quantities such that an isocyanate index of about 50 to about 200 (preferably 90 to 135) is maintained.

DETAILED DESCRIPTION OF THE INVENTION

Suitable solid polyisocyanates (a) are those having a melting point above about 80° C., including, for example, 1,5-naphthalene diisocyanate, dimeric 4,4'-diisocyanatodiphenyl-methane, dimeric 2,4-diisocyanatotoluene (dimeric 2,4-TDI, or "TT"), 3,3'-diisocyanato-4,4'-dimethyl-N,N'-diphenylurea (TDI urea diisocyanate, or "TDIH"), and N,N!-bis[4-(4- or 2-iso-cyanatophenylmethyl)phenyl] ura. Dimeric 2,4-diisocyanato-toluene and 3,3'-diisocyanato-4,4'-dimethyl-N,N'-diphenylurea are particularly preferred. 3,3'-Diisocyanato-4,4'-dimethyl-N,N'-diphenylurea can be prepared, for example, by the reaction of two moles of 2,4-diisocyanatotoluene and one mole of water. The solid polyisocyanates preferably have a particle size of about 0.1 to about 150 μm (more preferably 1 to 20 μm).

When preparing the compositions of the invention, it is of considerable advantage if the solid isocyanate is "deactivated" (that is, stabilized) with an appropriate quantity of an aliphatic diamine in the presence of at least a portion of polyether component (b). The reaction of the aliphatic diamine on the surface of the isocyanate particles results in the formation of a thin polyurea shell which acts as an anti-diffusion layer. This shell is destroyed upon heating and the components then react rapidly with one another. This process, which is described, for example, in U.S. Pat. No. 4,483,974, gives one-component systems which can be hardened at any chosen time at temperatures in the range from about 100 to about 150° C. In general, the process is carried out by adding, as a powder or fine granules, the desired quantity of solid polyester (c) that has a molecular weight of about 400 to about 20,000 and is solid at room temperature to polyether polyol (b) that has a molecular weight of about 400 to about 10,000 and is liquid at room temperature. The resultant mixture is then thoroughly homogenized by means of a stirrer. It is advisable to add a small quantity of an aliphatic diamine to the suspension at this stage to form an anti-diffusion layer on the surface of the particles when the solid isocyanate is subsequently added. The quantity of aliphatic diamine is selected to be just sufficient to form such an anti-diffusion layer and can readily be determined by one skilled in the art.

The polyester powder may also be externally mixed with the total quantity of solid isocyanate and the resulting mixture added to the polyether at a later stage. The polyether may optionally contain a small quantity of aliphatic diamine to form an anti-diffusion layer, as well as OH- or NH$_2$-terminated low molecular weight chain-extending agents and other auxiliaries such as catalysts. All isocyanate-reactive components must be taken into account for the NCO balance.

The polyisocyanates are optionally "deactivated" by the action of aliphatic polyamines having molecular weights of 32 to 399 and, optionally, aliphatic polyamines having molecular weights of 400 to 8,000. Examples of suitable polyamines include ethylenediamine, 1-amino-3,3,5-trimethyl-5-aminomethylcyclohexane, 3,3'-dimethyl-4,4'-diaminodicyclohexyl-methane, diethylenetriamine, and methyl nonanediamine.

Other suitable stabilizers include hydrazine, generally in the form of hydrazine hydrate; (C$_{1-6}$ alkyl)-substituted hydrazines, such as methylhydrazine, ethyl hydrazine, (hydroxyethyl)hydrazine, or N,N'-dimethylhydrazine; hydrazide-terminated compounds, such as carbodihydrazide, ethylene bis-carbazinic ester, β-semicarbazidopropionic acid hydrazide, or isophorone bis-semicarbazide. Other deactivating agents are described in German Offenlegungsschriften 3,230,757 and 3,112,054.

Open-chain monocyclic or bicyclic amidines or guanidines containing no isocyanate-reactive hydrogen atoms may also be used as stabilizers for the isocyanate component. Examples of such compounds include tetramethylguanidine, pentamethyl guanidine, 1,2-dimethyltetrahydropyrimidine, 1,8-diazabicyclo[5.4.0] undec-7-ene, and 1,5-diazabicyclo-[4.3.0]non-4-ene. Further examples of such amidines can be found in German Offenlegungsschrift 3,403,500.

Compounds suitable for use as polyester component (c) include solid polyesters that contain 2 to 8 (preferably 2 to 4) hydroxyl groups, as well as, optionally, free carboxyl groups, and have molecular weights of 400 to 20,000. Suitable o polyesters of this type are solid at room temperature and have softening points of about 40 to about 150° C. Branched polyesters containing 2.1 to 4 OH groups are particularly preferred. Such polyesters can be obtained by polycondensation of hydroxycarboxylic acids or polymerization of their lactones, optionally in the presence of branching agents (that is, polyhydric alcohols and/or carboxylic acids). Examples are hydroxycaproic acid and caprolactone. Suitable polyesters may also be obtained by reaction of dihydric or polyhydric alcohols, such as trihydric or tetrahydric alcohols, with dibasic or polybasic carboxylic acids.

Instead of using the free polycarboxylic acids, it is also possible to use corresponding polycarboxylic anhydrides or corresponding polycarboxylic acid esters of lower alcohols, or mixtures thereof, for the production of the polyesters. The polycarboxylic acids can be aliphatic, cycloaliphatic, aromatic, and/or heterocyclic and can optionally be substituted (for example, by halogen atoms), and/or unsaturated. Examples of such carboxylic acids and derivatives thereof include succinic acid, adipic acid, suberic acid, azelaic acid, sebacic acid, dodecanedioic acid, diglycolic acid, phthalic acid, isophthalic acid, hexahydrophthalic acid, phthalic anhydride, tetrahydrophthalic anhydride, hexahydrophthalic anhydride, tetrachlorophthalic anhydride, terephthalic acid, glutaric acid, glutaric anhydride, maleic acid, maleic anhydride, fumaric acid, trimellitic acid, pyromellitic acid, dimerized and trimerized unsaturated fatty acid, dimerized unsaturated fatty acids (such as oleic acid), terephthalic acid dimethyl ester, terephthalic acid bis-glycol ester, citric acid, and endomethylene tetrahydrophthalic anhydride.

Suitable polyhydric alcohols include ethylene glycol, diethylene glycol, triethylene glycol, 1,2- and 1,3-propylene glycol, dipropylene glycol, 1,4- and 2,3-butylene glycol, 1,6-hexanediol, 1,8-octanediol, neopentyl glycol, 1,4-bis-(hydroxymethyl)cyclohexane, 2-methyl-1,3-propanediol, glycerol, trimethylolpropane, 1,2,6-hexanetriol, 1,2,4-butanetriol, trimethylolethane, pentaerythritol, tricyclododecane diol, hydroquinone bis(hydroxyethyl) ether, 2,2-bis(hydroxyphenyl)-propane bis(hydroxyethyl) ether, quinitol, mannitol, sorbitol, formitol, and methyl glycoside.

To prepare relatively high molecular weight polyesters having molecular weights of about 5,000 to about 20,000 and softening points (ring and ball method) of, preferably, about 70 to about 150° C., terephthalic acid or isophthalic acid is used in a quantity of 20 to 70 mole-%, based on the amount of the polycarboxylic acid component. To produce polyesters having lower molecular weights of about 400 to about 5,000 and softening points of about 40 to about 100° C., any of the other polycarboxylic acids discussed above (particularly adipic acid) may also be used in essentially any quantities based on the amount of the polycarboxylic acid component. The preparation of such polyesters is known and is described, for example, in Houben-Weyl, *Methoden der organischen Chemie.* Vol. 14/2, Thieme-Verlag, Stuttgart, 1961.

Other polyester components suitable for use according to the invention include those containing aliphatic or aromatic terminal amino groups that can be obtained by hydrolysis, preferably basic hydrolysis, of corresponding NCO prepolymers based on relatively high molecular weight polyhydroxyl compounds and excess aliphatic or aromatic diisocyanates.

Examples process can be found in German Offenlegungsschriften 2,948,419, 3,039,600, and 3,112,118 and European Patent Applications 61,627, 71,132, and 71,139. The first of these patents, German Offenlegungsschrift 2,948,419, also mentions other known processes for the preparation of relatively high molecular weight amino compounds. The process according to these patents is concerned not only with polyether amines, but also with polyester, polyacetal, polythioether, or polycaprolactone polyamines (preferably difunctional or trifunctional polyamines) that contain urethane groups (from the reaction of the corresponding relatively high molecular weight polyhydroxyl compounds with the excess polyisocyanates) and that bear amino groups at the residue of what had been the polyisocyanate. The aromatic polyamines of relatively high molecular weight, however, may also be obtained by other methods, for example, by reaction of NCO prepolymers with excess quantities of hydrazine, aminophenyl ethylamine, or other diamines in accordance with German Auslegeschrift 1,694,152. Another possible synthesis is described in French Patent 1,415,317, according to which the NCO prepolymers are converted into N-formyl derivatives by reaction with formic acid, followed by saponification. The reaction of NCO prepolymers with sulfamic acid in accordance with German Auslegeschrift 1,155,907 also gives polyamines of relatively high molecular weight.

The isocyanate-reactive suspension medium used to suspend the solid (optionally stabilized) polyisocyanates and the solid (preferably powder-form) polyesters includes a relatively high molecular weight liquid polyol and/or polyamine (i.e., component (b)), optionally in admixture with a low molecular weight liquid polyol and/or polyamine (i.e., optional component (d)).

Suitable relatively high molecular weight polyols (b) having a molecular weight in the range from about 400 to about 10,000 include polyethers and polythioethers containing at least 2 (preferably 2 to 4) hydroxyl groups and generally having a molecular weight of 400 to 8,000 that are known for the preparation of homogeneous and cellular polyurethanes. Examples of such polyethers and polythioethers can be found, for example, in German Offenlegungsschriften 2,920,501, 2,854,384, and 3,230,757.

Polyhydroxyl compounds already containing urethane or urea groups and optionally modified natural polyols, such as castor oil, carbohydrates, or starch, may also be used. Adducts of alkylene oxides with phenol-formaldehyde resins or with urea-formaldehyde resins are also suitable for use according to the invention.

Hydroxyl-terminated polybutadienes are also suitable for use in accordance with the invention because they give particularly elastic and hydrolysis-stable products. Polyhydroxyl compounds containing high molecular weight polyadducts or polycondensates or polymers in finely dispersed or even dissolved form may also be used.

Polyadduct-containing polyhydroxyl compounds are obtained by carrying out polyaddition reactions (for example, reactions between polyisocyanates and aminofunctional compounds) or polycondensation reactions (for example, between formaldehyde and phenols and-/or amines) in situ in the above-mentioned hydroxyl-containing compounds.

Polyhydroxyl compounds modified by vinyl polymers, as obtained, for example, by polymerization of styrene and acrylonitrile in the presence of polyethers or polycarbonate polyols, are also suitable for use according to the invention.

Representatives of these compounds that can be used according to the invention are described, for example, in *High Polymers*. Vol. XVI; "Polyurethanes, Chemistry and Technology", by Saunders and Frisch, Interscience Publishers, New York, London, Vol. I, 1962, pages 32–42, 44, and 54, and Vol. II, 1964, pages 5–6 and 198–199; *Kunststoff-Handbuch*, Vol. VII, Vieweg-Höchtlen, Carl-Hanser-Verlag, Munich 1966, pages 45–71, and German Offenlegungsschriften 2,854,384 and 2,920,501.

Other suitable polyols include polymers containing hydroxyl groups, such as copolymers of olefinically unsaturated monomers and olefinically unsaturated monomers containing active hydrogen, described, for example, in European Patent Application 62,780, page 5 and the Examples. Such compounds are preferably used for sealing compounds, fillers, adhesives, or undersealing compounds.

Mixtures of the above-mentioned compounds containing at least two isocyanate-reactive hydrogen atoms can, of course, also be used.

Low molecular weight chain-extending agents or crosslinking agents may also be used as polyols (d) optionally present in the suspensions. Suitable chain-extending agents or crosslinking agents include, preferably, at least difunctional compounds that contain hydroxyl groups attached to aliphatic and/or cycloaliphatic groups and have molecular weights of about 62 to about 399. Preferred compounds of this type include low molecular weight diols containing hydroxyl groups attached to aliphatic or cycloaliphatic groups and having a molecular weight in the range from 62 to 399.

Suitable low molecular weight chain-extending or crosslinking agents generally contain 2 to 8 (preferably 2 to 4 and more preferably 2)hydroxyl groups. Mixtures of different compounds may, of course, also be used. Examples of such compounds include ethylene glycol, diethylene glycol, triethylene glycol, tetraethylene glycol, trimethylene glycol, 2,3- and/or 1,4-butanediol, 1,5-pentanediol, 1,6-hexanediol, neopentyl glycol, 1,4-bis(hydroxyethyl)cyclohexane, 1,4-dihydroxycyclohexane, tetephthalic acid bis($\beta$-hydroxyethyl) ester, 1,4,3,6-dianhydrohexitols, 1,4-monoanhydrotetritols, propylene glycol, dipropylene glycol, tripropylene glycol, tetrapropylene glycol, bis(2-hydroxyethyl)hydroquinone, and bis(2-hydroxyethyl)resorcinol. Suitable polyfunctional compounds include trimethylolpropane, trimethylolethane, 1,26-hexanetriol, glycerol, pentaerythritol, quinitol, mannitol, sorbitol, castor oil, and formose or formitol.

Diols or polyols containing tertiary amines, such as N-methyldiethanolamine, triethanolamine, or N,N'-bis(-hydroxyethyl) piperazine, are also suitable.

It is also possible to use diols containing additional groups, for example adipic acid bis(2-hydroxyethyl) ester, terephthalic acid bis(2-hydroxyethyl) ester, diol urethanes, diol ureas, or polyols containing sulfonate and/or phosphonate groups. Examples include 1,6-hexamethylene bis(2-hydroxyethyl urethane), 4,4'-diphenylmethane bis(2-hydroxyethyl urea), and the adduct of sodium bisulfite with 1,4-butanediol or alkoxylation products thereof. Other low molecular weight compounds are described in detail in German Offenlegungsschrift 2,854,384.

The low molecular weight and relatively high molecular weight polyols described above may optionally be modified by preliminary reaction with a substoichiometric quantity of polyisocyanate. Suitable polyisocyanates for this purpose include aliphatic, cycloaliphatic, araliphatic, aromatic, and/or heterocyclic polyisocyanates of the type described, for example, in German Offenlegungsschrift 2,920,501 at pages 12 to 16. In general, it is particularly preferred to use polyisocyanates readily obtainable on an industrial scale, such as 2,4- and 2,6-toluene diisocyanate and mixtures of these isomers ("TDI"), polyphenyl polymethylene polyisocyanates of the type obtained by phosgenation of aniline-formaldehyde condensates ("crude MDI"), 4,4'- and/or 2,4'-diphenylmethane diisocyanate, 1,6-hexamethylene diisocyanate, 1-isocyanato- 3,3,5-trimethyl-5-isocyanatomethylcyclohexane, and perhydro-2,4'- and /or -4,4'-diphenylmethane diisocyanate.

Also suitable as the isocyanate-reactive suspension medium used to suspend the solid (optionally stabilized) polyisocyanates and the solid (preferably powder-form) polyesters are relatively high molecular weight liquid aromatic and/or aliphatic polyamines, optionally in admixture with a low molecular weight liquid aromatic and/or aliphatic polyamine. Relatively high molecular weight aliphatic and/or relatively high molecular weight or low molecular weight aromatic polyamines are preferred. Low molecular weight aliphatic polyamines can be present as stabilizers in at most small quantities; relative large quantities of free, low molecular weight aliphatic polyamines would result in overstabilization. Only low molecular weight, aliphatic polyamines chemically bound in the form of polyureas may be present in relatively large quantities.

The relatively high molecular weight polyamines containing aromatic amino groups and having a molecular weight in the range from about 400 about 8,000 that are used according to the invention include, preferably, polyamines of the type obtainable by hydrolysis, preferably basic hydrolysis, of corresponding NCO prepolymers based on relatively high molecular weight polyhydroxyl compounds and excess aromatic diisocyanates. Examples of this process can be found in German Offenlegungsschriften 2,948,419, 3,039,600, and 3,112,118 and European Patent Applications 61,627, 71,132, and 71,139. The first of these patents, German Offenlegungsschrift 2,948,419, also mentions other known processes for the preparation of relatively high molecular weight amino compounds. The process according to these patents is concerned is concerned mainly with polyether amines (preferably difunctional or trifunctional polyamines) that contain urethane groups (from the reaction of the corresponding relatively high molecular weight polyhydroxyl compounds with the excess polyisocyanates) and that bear amino groups at the residue of what had been the polyisocyanate. The aromatic polyamines of relatively high molecular weight, however, may also be obtained by other methods, for example, by reaction of NCO prepolymers with excess quantities of hydrazine, aminophenyl ethylamine, or other diamines in accordance with German Auslegeschrift 1,694,152. Another possible synthesis is described in French Patent 1,415,317, according to which the NCO prepolymers are converted into N-formyl derivatives by reaction with formic acid, followed by saponification. The reaction of NCO prepolymers with sulfamic acid in accordance with German Auslegeschrift 1,155,907 also gives polyamines of relatively high molecular weight.

Suitable relatively high molecular weight polyamino compounds containing aliphatic amino groups and having a molecular weight of about 400 to about 8,000 (preferably 1,000 to 4,000) include those of the type obtained by reductive amination of polyoxyalkylene glycols with ammonia in accordance with Belgian Patent 634,741 and U.S. Pat. No. 3,654,370. Other relatively high molecular weight polyoxyalkylene polyamines may be obtained by the methods listed in "Jeffamine, Polyoxypropylene Amines", a company publication of the Texaco Chemical Co., 1978, for example, by hydrogenation of cyanoethylated polyoxypropylene glycols (German Offenlegungsschrift 1,193,671), by amination of polypropylene glycol sulfonic acid esters (U.S. Pat. No. 3,236,895), by treatment of a polyoxyalkylene glycol with epichlorohydrin and a primary amine (French Patent 1,466,708), or by reaction of NCO prepolymers with enamines, aldimines, or ketimines containing hydroxyl groups and subsequent hydrolysis in accordance with German Offenlegungsschrift 2,546,536. Other suitable relatively high molecular weight aliphatic diamines and polyamines include polyamines obtainable in accordance with German Offenlegungsschriften 2,948,419, 3,039,600, and 3,112,118, and European Patent Applications 61,627, 71,132, and 71,139 by alkaline hydrolysis of NCO prepolymers (based on aliphatic diisocyanates) with bases at the carbamate stage.

The process according to German Offenlegungsschrift 2,948,419 and the other cited literature references discussed above are concerned mainly with polyether polyamines or polythioether polyamines (preferably difunctional or trifunctional polyamines) that contain urethane groups (from the reaction of the corresponding relatively high molecular weight polyhydroxyl compounds with the excess polyisocyanates) and that bear amino groups at the residue of what had been the polyisocyanate. The aromatic polyamines of relatively high molecular weight, however, may also be obtained by other methods, for example, by reaction of NCO prepolymers with excess quantities of hydrazine, aminophenyl ethylamine, or other diamines in accordance with German Auslegeschrift 1,694,152. Another possible synthesis is described in French Patent 1,415,317, according to which the NCO prepolymers are converted into N-formyl derivatives by reaction with formic acid, followed by saponification.

These relatively high molecular weight aliphatic polyamines may be used both as stabilizers for the polyisocyanate component and as a further component of the suspension medium.

Low molecular weight aromatic diamines having a molecular weight in the range from about 108 to about 399 may be used as chain-extending agents. The term aromatic polyamine is also understood to include amines which contain the amino group attached to heterocyclic radicals of aromatic character. Examples of suitable aromatic polyamines include p-phenylenediamine, 2,4- and/or 2,6-toluenediamines, diphenylmethane-4,4'-and/or -2,4'- and/or -2,2'-diamines, 3,3'-dichloro-4,4'-diaminodiphenyl-methanes, 3'-($C_{1-4}$ alkyl)-4,4' diaminodiphenylmethanes, 3,3'-di($C_{1-4}$ alkyl)-4,4'-diaminodiphenylmethanes, 3,3',5,5'-tetra($C_{1-4}$ alkyl)-4,4'-diphenylmethanes, 4,4'-diaminodiphenyl sulfides, sulfoxides, or sulfones, diamines containing ether groups according to German Offenlegungsschriften 1,770,525 and 1,809,172 (U.S. Pat. Nos. 3,654,364 and 3,736,295), 2-halo-1,3-phenylenediamines optionally substituted in the 5-position (German Offenlegungsschriften 2,001,772, 2,025,896, and 2,065,869), bis-anthranilic acid esters (German Offenlegungsschriften 2,040,644 and 2,160,590), 2,4-diaminobenzoic acid esters according to German Offenlegungsschriften 2,025,900, and toluenediamines substituted by one or two $C_{1-4}$ alkyl groups. Particularly preferred chain-extending agents are 3, 5-diethyl-2,4- and/or -2,6-diaminotoluene (more particularly, their technical (80/20) or (65/35) isomer mixtures), asymmetrically tetraalkyl-substituted diamino-diphenyl methanes such as 3,5-diethyl-3',5'-diisopropyl-4,4'-diaminodiphenylmethane and isomer mixtures thereof according to German Offenlegungsschriften 2,902,090, 4,4'-diaminobenzanilide, 3,5-diaminobenzoic acid alkyl) ($C_{1-4}$ alkyl) ester, 4,4'- and/or 2,4'-diaminodiphenylmethane, and naphthylene-1,5'-diamine.

Mixtures of the above-mentioned polyhydroxyl compounds and polyamino compounds can, of course, be used.

Typical polyurethane catalysts may optionally be used. Of these, tertiary amines or metal catalysts are particularly preferred.

Suitable tertiary amine catalysts include tertiary amines, such as triethylamine, tributylamine, N,N,N',N'-tetramethyl ethylenediamine, 1,4-diazabicyclo[2.2.2]octane, N,N-dimethylbenzylamine, and N,N-dimethylcyclohexylamine.

Suitable organometallic catalysts include organotin compounds and organolead compounds. Preferred organotin compounds include tin(II) salts of carboxylic acids, such as tin(II) ethylhexoate and tin(II) stearate, and dialkyl tin salts of carboxylic acids, such as dibutyltin dilaurate or dioctyltin diacetate. Preferred organolead compounds include lead(II) salts of carboxylic acid, such as lead(II) naphthenate, lead(II) ethylhexoate, lead(II) stearate, and lead(II) bis(diethyl dithiocarbamate).

Other suitable catalysts and information on their mode of action can be found in *Kunststoff-Handbuch*, Vol. VII, edited by Vieweg and Höchtlen, Carl-Hanser-Verlag, Munich 1966, for example, on pages 96–102, and German Offenlegungsschrift 3,230,757.

The catalysts are generally used in a quantity of from about 0.001 to about 10% by weight, based on the composition as a whole.

The generally inorganic auxiliaries and additives optionally present include dyes or pigments and fillers, such as heavy spar, chalk, silica flour, kieselguhr, silica gel, precipitated silicas, pyrogenic silicas, gypsum, talcum, active carbon, carbon black, and metal powders.

Other suitable auxiliaries and additives include o reaction retarders, for example acidic substances such as hydrochloric acid, organic acid halides, or organic acids; known flameproofing agents, such as tris(chloroethyl) phosphate or ammonium phosphate and polyphosphate; stabilizers against the effects of ageing and weathering, such as phenolic antioxidants and light stabilizers; plasticizers; and fungistatic and/or bacteriostatic agents.

Suitable fillers include fibrous materials (i.e., any known fibrous reinforcing materials) such as glass fibers or fibers based on an organic polymer. Suitable organic polymers include polyesters, such as polyethylene terephthalate, or, preferably, aromatic polyamides, such as m-phenylene/isophthalic acid polyamide or poly-p-phenylene terephthalamide or even polycaprolactam. These fibrous materials may be present, for example, in the form of mats, rovings, full-length fibers, nonwovens, woven fabrics, or a random mixture of staple fibers. Glass fibers that have been sized to make them receptive to polyurethanes are preferred. The quantity of filler to be incorporated depends on the desired improvement in the mechanical properties and is generally between about 5 and about 60% by weight fibers.

When cellular polyurethanes are to be produced by the process of the invention, water and/or readily volatile organic substances are used as blowing agents. Suitable organic blowing agents include acetone, ethyl acetate, methanol, ethanol, halogen-substituted alkanes (such as methylene chloride, chloroform, ethylidene chloride, vinylidene chloride, monofluorotrichloromethane, chlorodifluoromethane, and dichlorodifluoromethane), butane, hexane, heptane, and diethyl ether.

Further examples of blowing agents and information on the use of blowing agents can be found in *Kunststoff-Handbuch*. Vol. VII, edited by Vieweg and Höchtlen, Carl-Hanser-Verlag, Munich 1966, for example, on pages 108, 109, 453, 455, and 507–510.

Surface-active additives (emulsifiers and foam stabilizers) may also be used. Suitable emulsifiers include sodium salts of castor oil sulfonates or even of fatty acids or salts of fatty acids with amines, such as diethylamine oleate or diethanolamine stearate. Alkali or ammonium salts of sulfonic acids, for example, of dodecylbenzenesulfonic acid or dinaphthylmethanedisulfonic acid, or of fatty acids, such as ricinoleic acid, or of polymeric fatty acids, may also be used as surface-active additives.

Suitable foam stabilizers are, preferably, watersoluble polyether siloxanes. The structure of these compounds is generally such that a copolymer of ethylene oxide and propylene oxide is attached to a polydimethylsiloxane residue. Foam stabilizers such as these are described, for example, in U.S. Pat. No. 2,764,565.

Known cell regulators, such as paraffins or fatty alcohols or dimethylpolysiloxanes, as well as pigments or dyes, may also be used.

Further examples of suitable surface-active additives and foam stabilizers, cell regulators, reaction retarders, o stabilizers, flameproofing agents, plasticizers, dyes and fillers, fungistatic and bacteriostatic agents, as well as information on the use of such additives and the way in which they work, can be found in *Kunststoff-Handbuch*. Vol. VI, edited Vieweg and Höchtlen, Carl-Hanser-Verlag, Munich 1966, for example, on pages 103–113 and German Offenlegungsschriften 2,854,384 and 2,920,501.

The reactive polyurethane mixtures according to the invention may be used for the production of elastomeric moldings, adhesives, sealing, and coating compounds.

The reactive polyurethane mixtures obtained according to the invention are pourable, knife-coatable, or spreadable at room temperature, depending on the viscosity and melt behavior of the starting components and on the quantitative ratio of o solid powder-form constituents to liquid constituents. These reactive mixtures are suspensions of a solid polyisocyanate stabilized by a polyadduct coating in the polyol and any optional polyamine component. These mixtures are hardened by application of heat at temperatures above room temperature (preferably from 100 to 150° C.). The processing of the heat-curable systems of the invention depends on their nature and the particular technical problem to be solved. They may be applied, for example, by hand or by a suitable delivery or transport unit, such as a cartridge or a knife, to any desired substrates, for example, bare or precoated metals or alloys of such metals, to plastic parts, to various industrial articles made from metals, glass, ceramics, or plastics (which may, for example, also be fiber-reinforced), and to textile substrates, such as nonwovens, knitted fabrics, and woven fabrics, (skiver) leather, matrices (for example, suede leather-silicone matrices), or temporary supports (for example, release papers). When so applied, these mixtures form coatings or finishes and may be cured at elevated temperature (i.e., temperatures above room temperature, preferably from 100 to 150° C.), optionally after further handling or industrial processing steps.

When blowing agents are used, it is possible to produce cellular polyurethanes optionally having an integral density structure.

Surface coatings, impression molds or moldings may also be produced by dip-coating processes.

The following examples further illustrate details for the preparation of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

Example 1 (Comparison Example)

A trifunctional liquid polypropylene glycol ether (molecular weight 3,000, OH number 56) (100 g) was mixed with 100 g of a solid powder-form polyester of adipic acid and ethylene glycol (molecular weight 2,000, OH value 56). The mixture was then heated to approximately 50 to 60° C. After a short time, an emulsion of molten polyester in the polyether was obtained. The two components are immiscible with one o another. After addition of 0.1 g of lead octoate (Octa-Soligen Pb 24, a product of Borchers) and 34.8 g of dimeric TDI ("TT"), the reaction mixture was degassed with stirring for 15 to 30 minutes under an aspirator vacuum. The reaction mixture was then poured into a mold and heated for 2 to 3 hours at 120° C. Rapid initial crosslinking was observed, reaching an end point after a time. An only partly crosslinked end product, in which a distinctly visible film of unchanged polypropylene glycol ether was situated on the surface, was ultimately obtained. No subsequent crosslinking occurred, even at relatively high temperatures.

EXAMPLE 2 (ACCORDING TO THE INVENTION)

When the mixture of 100 g of the liquid polypropylene glycol ether and 100 g of the powder-form polyester described in Example 1 was not heated to 50 to 60° C., the suspension behaved differently after the addition of lead octoate and dimeric TDI. When the mixture was then heated to 120 to 130° C., a fully crosslinked molding having a smooth, homogeneous surface was obtained after 2 to 3 hours.

EXAMPLE 3

Lead octoate (0.1 g) and 0.15 g LAROMIN C (bis-(3-methyl-4-aminocyclohexyl)methane, a product of BASF) were added to 100 g of a trifunctional polypropylene glycol ether (molecular weight 3,000, OH value 56). A powder-form $NH_2$-terminated polyester (NH value 48) (100 g) prepared by known methods (e.g., in accordance with European Patent Application 219,035) by alkaline hydrolysis of a preadduct of 1 mole of polyadipate (prepared using ethylene glycol and 1,4-butanediol as the esterification alcohol) and 2 mole of 2,4-diisocyanatotoluene (TDI) was then homogeneously mixed with the above polyether component. The temperature during this mixing step did not exceed the melting temperature or softening temperature of the polyester. After the further addition of 32.5 g of dimeric TDI, a liquid and readily pourable suspension was obtained and could be stored indefinitely at room temperature because of the formation of an anti-diffusion layer on the surface of the TT particles (polyurea shell by reaction of LAROMIN C with TT). The reaction mixture was then degassed under aspirator vacuum and poured into a suitable mold coated with release agent. The mixture hardened at a temperature of 120 to 130° C. and the molding could be removed from the mold about 1 hour after hardening. After further heating for 2 to 3 hours at 120° C., a homogeneous elastomer having the following mechanical properties was obtained:
Modulus (100%) (MPa) 7.5
Tensile strength (MPa) 22.0
Elongation at break (%) 500
Tear propagation resistance (KN/m) 34.5
Elasticity (%) 52
Hardness, Shore A 86

When, by contrast, the reaction mixture was heated before hardening to a temperature above the melting point of the $NH_2$-terminated component, two immiscible liquid phases were formed and immediately separated. Subsequent crosslinking at 120 to 130° C. led to an inhomogeneous and only partly crosslinked product which, in addition, had an oily layer of the polypropylene glycol ether on the surface of the molding. Products such as these are totally unsuitable for coating materials or adhesives where firm adhesion to the substrate is necessary.

EXAMPLES 4 to 6

GENERAL PROCEDURE FOR THE PREPARATION OF ADHESIVE CONTAINING OH-FUNCTIONAL POWDER-FORM FILLERS

The above-mentioned quantities of the finely ground polymer are added with continued stirring at room temperature or at moderately elevated temperature (<50° C.) to a suspension of a retarded polyisocyanate in a mixture of low molecular weight polyhydroxy and/or polyamino compounds having a viscosity (as measured at room temperature in accordance with DIN 53 019) of 0.1 to 250 Pa·s, preferably 1 to 10 Pa·s, until a macroscopically homogeneous mixture is formed.

Stirrers and mixers having rotating stirring elements, such as anchor stirrers or helical stirrers or even Z or sigma kneaders, are suitable for the preparation of s relatively large quantities of the mixtures according to the invention.

GENERAL PROCEDURE FOR THE APPLICATION OF THE MIXTURES ACCORDING TO THE INVENTION AS ADHESIVES

The mixtures according to the invention are applied to one or both of the parts to be bonded at temperatures below 50° C., preferably at room temperature.

If the reactivity and thermal stability of the mixtures allow, application temperatures above 50° C. are also possible.

BONDING

SMC platelets (SMC 109, a product of Bayer AG, Leverkusen, Germany) that are 4 mm thick and 20 mm wide and 40 mm long are bonded with a 10-mm overlay by coating one SMC platelet with the mixture of the invention on this overlay surface and by placing a second, optionally uncoated platelet thereon with the described overlay. A third SMC platelet of the same dimensions is used both as a support and as a fixing aid for avoiding changes in the overlay during the curing process. A 200-μm thick metal distance plate lying on this third SMC platelet (where it acts as an intermediate layer between the support and the applied SMC platelet) produces a constant glueline thickness of 200 μm.

CHARACTERISTICS OF THE FRACTURE TYPE OF THE GLUELINE

An A-fracture is the term used to describe the fracture type in which separation occurs at the adhesive-adherend interface.

A K-fracture is a fracture within the glueline.

MF (material failure) signifies failure of the adherend material under tensile shear testing.

CURING THE GUIDELINES

Heat must be applied to produce the final bond strengths. This means increasing the temperature in the glueline and exceeding a minimum temperature for a specified time, generally 10 seconds to 60 minutes and preferably 30 seconds to 20 minutes. The temperature and the heating time depend on the formulation determined in advance by the user and the adherend material.

In any event, however, a temperature above the formulation-specific "thickening temperature" of the retarded polyisocyanate must be determined in advance for the predetermined curing time in accordance with known methods (e.g., German Offenlegungsschrift 3,403,499, believed to correspond to U.S. Pat. No. 4,595,445).

Examples of formulations for one-component polyurethane adhesives containing an addition of OH-functional powder-form fillers are shown in the following Table.

TABLE

|  | Ex. 4 (% by weight) | Ex. 5 (% by weight) | Ex. 6 (% by weight) |
| --- | --- | --- | --- |
| 2,2-bis(4-hydroxyphenyl)-propane-started polyoxypropylene ether diamine (MW 1,000) | 22.0 | 21.3 | 20.0 |
| 2,2-bis(4-hydroxyphenyl)-propane-started polyoxypropylene ether diol (MW 550) | 29.0 | 27.8 | 26.2 |
| 2,4-diamino-3,5-diethyltoluene | 2.5 | 2.5 | 2.4 |
| Dimeric TDI | 36.0 | 36.0 | 36.0 |
| Lead octoate | 0.2 | 0.2 | 0.2 |
| 4,4'-diamino-3,3'-dimethyl-dicyclohexylmethane | 0.2 | 0.2 | 0.2 |
| Hydroxypolyester (OH number approx. 50) (m.p. ca. 100° C.) | 9.9 | 12.0 | 15.0 |
| SMC/SMC tensile shear strength after curing for 30 mins at 130° C. (DIN 53 283) (average value from 5 measurements) (N/mm$^2$) | 10.25 | 9.6 | 9.35 |
| SMC/SMC heat failure (ASTM D 4498) | 181° C. | 186° C. | 188° C. |

What is claimed is:

1. A heat-curable reaction system comprising a mixture of
   (a) a solid polyisocyanate having a melting point above 80° C.,
   (b) a linear or branched OH- and/or NH$_2$-terminated polyoxyalkylene polyether that has a molecular weight of 400 to 10,000 and is liquid at room temperature,
   (c) a solid linear or branched OH- and/or NH$_2$-terminated polyester that has a molecular weight of 400 to 20,000 and is solid at room temperature, wherein said polyester is thoroughly distributed throughout the mixture but is not homogeneously miscible with polyether (b), and
   (d) optionally, a low molecular weight chain-extending agent that contains OH and/or NH$_2$ groups and has a molecular weight of 62 to 399.

2. A heat-curabble reaction system according to claim 1 wherein the mixture additionally comprises
   (e) optionally, catalysts and auxiliaries.

3. A heat-curable reaction system according to claim 1 wherein the solid polyisocyanate is deactivated by adding an aliphatic diamine in a sufficient quantity to form an anti-diffusion layer.

4. A heat-curable reaction system according to claim 3 wherein the aliphatic diamine is used in the presence of at least a portion of the polyether component (b).

5. A heat-curable reaction system according to claim 1 wherein the solid polyisocyanate (a) is dimeric 2,4-diisocyanatotoluene or 3,3'-diisocyanato-4,4'-dimethyl-N,N'-diphenylurea.

6. A heat-curable reaction system according to claim 5 wherein the solid polyisocyanate has a particle size of 0.1 to 150 μm.

7. A heat-curable reaction system according to claim 5 wherein the solid polyisocyanate has a particle size of 1 to 20 μm.

8. A heat-curable reaction system according to claim 1 wherein the polyether (b) has a molecular weight of 1,000 to 6,000.

9. A heat-curable reaction system according to claim 1 wherein the polyether (b) has a molecular weight of 1,000 to 4,000.

10. A heat-curable reaction system according to claim 1 wherein the polyester (c) has a molecular weight of 1,000 to 6,000.

11. A heat-curable reaction system according to claim 1 wherein the polyester (c) is solid at room temperature and has a softening point of 40 to 150° C.

12. A heat-curable reaction system according to claim 1 wherein the polyester (c) is solid at room temperature and has a softening point of 40 to 130° C.

13. A heat-curable reaction system according to claim 1 wherein the polyester (c) is a fine powder having a particle size of from 10 to 200 μm.

14. A heat-curable reaction system according to claim 1 wherein the polyester (c) is a fine powder having a particle size of from 20 to 100 μm.

15. In a method for the preparation of an elastomer, a coating compound, a sealing compound, or an adhesive, the improvement comprising curing a heat-curable reaction system according to claim 1 by heating said heat-curable reaction system to a temperature above room temperature.

16. In a method for the preparation of an elastomer, a coating compound, a sealing compound, or an adhesive, the improvement comprising curing a heat-curable reaction system according to claim 1 by heating said heat-curable reaction system to a temperature of from 100 to 150° C.

* * * * *